(12) United States Patent
Hochmuth et al.

(10) Patent No.: US 8,631,342 B2
(45) Date of Patent: Jan. 14, 2014

(54) COMPUTER DISPLAY CONTROL SYSTEM AND METHOD

(75) Inventors: Roland M. Hochmuth, Fort Collins, CO (US); John Marks, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2549 days.

(21) Appl. No.: 11/020,982

(22) Filed: Dec. 22, 2004

(65) Prior Publication Data

US 2006/0136835 A1    Jun. 22, 2006

(51) Int. Cl.
*G06F 3/048*    (2013.01)
*G06F 3/00*     (2006.01)

(52) U.S. Cl.
USPC ........... 715/779; 715/745; 715/751; 715/778; 715/851

(58) Field of Classification Search
USPC .................. 715/778, 779, 745, 751, 759, 851
See application file for complete search history.

(56) References Cited

U.S. PATENT DOCUMENTS

| | | | |
|---|---|---|---|
| 4,937,036 A | 6/1990 | Beard et al. | |
| 4,994,912 A | 2/1991 | Lumelsky et al. | |
| 5,113,517 A | 5/1992 | Beard et al. | |
| 5,351,067 A * | 9/1994 | Lumelsky et al. | 345/561 |
| 5,469,536 A | 11/1995 | Blank | |
| 5,499,334 A * | 3/1996 | Staab | 715/778 |
| 5,564,002 A * | 10/1996 | Brown | 715/778 |
| 5,633,654 A | 5/1997 | Kennedy, Jr. et al. | |
| 5,790,120 A * | 8/1998 | Lozares et al. | 715/779 |
| 5,841,435 A * | 11/1998 | Dauerer et al. | 715/775 |
| 6,356,313 B1 | 3/2002 | Champion et al. | |
| 6,400,374 B2 | 6/2002 | Lanier | |
| 6,583,793 B1 | 6/2003 | Gould et al. | |
| 6,600,500 B1 * | 7/2003 | Yamamoto | 715/795 |
| 6,639,613 B1 * | 10/2003 | Nason et al. | 715/778 |
| 6,678,007 B2 * | 1/2004 | Nason et al. | 348/564 |
| 6,710,788 B1 * | 3/2004 | Freach et al. | 715/778 |
| 6,710,790 B1 * | 3/2004 | Fagioli | 715/802 |
| 6,781,611 B1 * | 8/2004 | Richard | 715/779 |
| 7,010,755 B2 * | 3/2006 | Anderson et al. | 715/778 |
| 7,012,606 B2 * | 3/2006 | Swedberg et al. | 345/473 |
| 7,047,500 B2 * | 5/2006 | Roelofs | 715/779 |
| 7,088,374 B2 * | 8/2006 | David et al. | 345/619 |
| 7,239,324 B2 * | 7/2007 | Wilt et al. | 345/535 |
| 7,350,154 B2 * | 3/2008 | Anderson et al. | 715/778 |
| 7,978,172 B2 * | 7/2011 | Fujita | 345/156 |
| 2002/0057295 A1 * | 5/2002 | Panasyuk et al. | 345/804 |
| 2004/0189669 A1 * | 9/2004 | David et al. | 345/619 |
| 2005/0015731 A1 * | 1/2005 | Mak et al. | 715/779 |
| 2005/0132299 A1 * | 6/2005 | Jones et al. | 715/759 |
| 2005/0190148 A1 * | 9/2005 | Fujita | 345/156 |
| 2005/0278650 A1 * | 12/2005 | Sims et al. | 715/778 |
| 2006/0230156 A1 * | 10/2006 | Shappir et al. | 709/227 |
| 2006/0284785 A1 * | 12/2006 | Bitterlich | 345/1.1 |

\* cited by examiner

*Primary Examiner* — Nicholas Augustine
*Assistant Examiner* — Meseker Takele

(57) ABSTRACT

A computer display control system comprises an input module adapted to receive a user input corresponding to a composited desktop display where the composited desktop display displays at least two active desktops corresponding to at least two different computers. The input module is adapted to automatically determine to which of the desktops the user input corresponds.

30 Claims, 9 Drawing Sheets

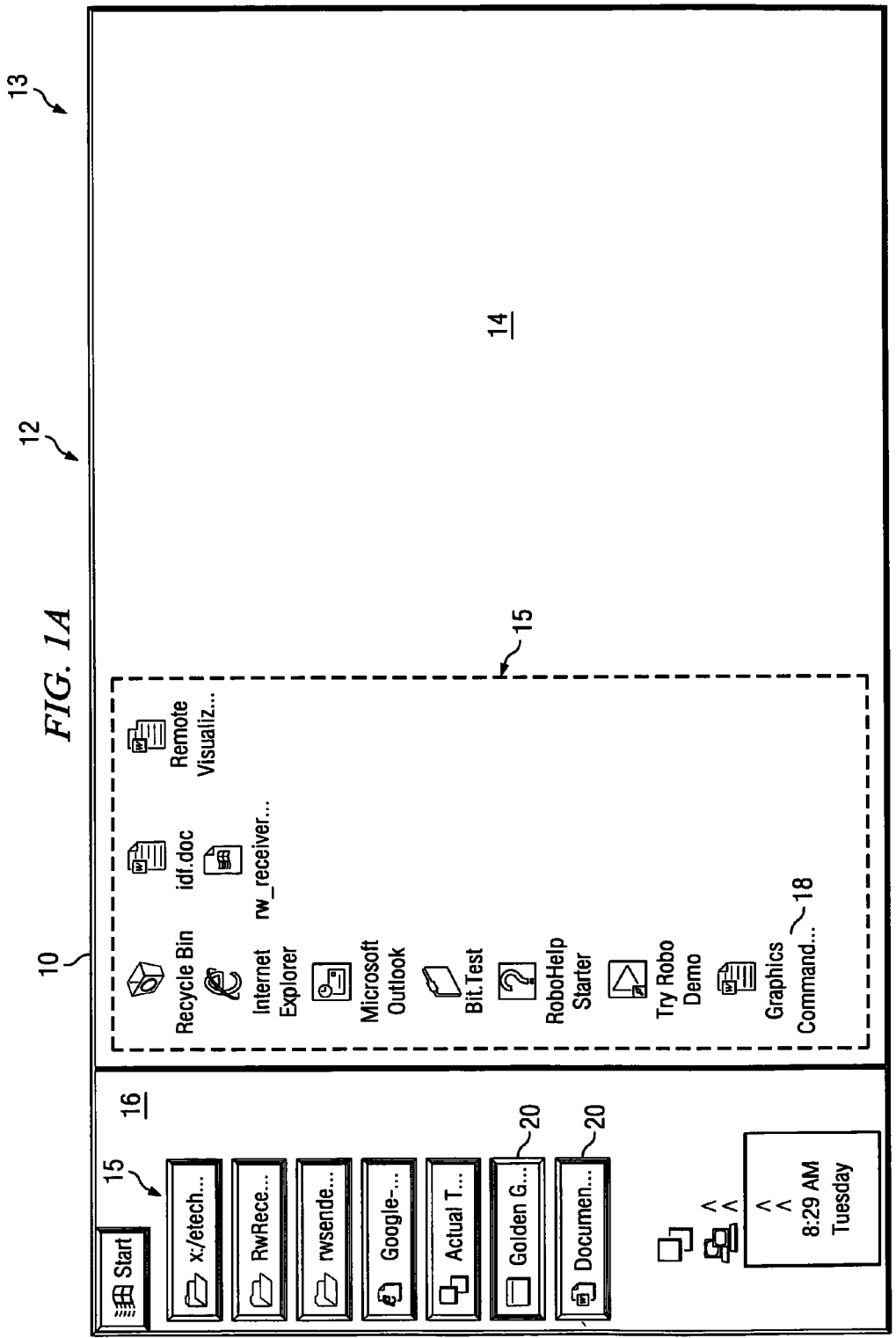

COMPUTER DISPLAY CONTROL SYSTEM AND METHOD

RELATED APPLICATION

NOT APPLICABLE.

BACKGROUND

In particular types of working environments, it is advantageous, or perhaps even necessary, to be able to view multiple running software applications and/or web sites practically simultaneously. For example, in a financial or brokerage environment, a user generally has access to, or at least the ability to view, multiple displays or computer monitors each providing the user with different types of desired information. However, having multiple monitors or displays increases costs associated with providing and/or maintaining a workstation or working environment. Additionally, interacting with each application and/or web site sometimes requires separate input devices, thereby resulting in increased costs.

BRIEF DESCRIPTION OF THE DRAWINGS

For a more complete understanding of the present invention, the objects and advantages thereof, reference is now made to the following descriptions taken in connection with the accompanying drawings in which:

FIGS. 1A-1D are diagrams illustrating screen displays of a client computer utilizing a computer display control system in accordance with an embodiment of the present invention;

DETAILED DESCRIPTION OF THE DRAWINGS

Figure 1B:
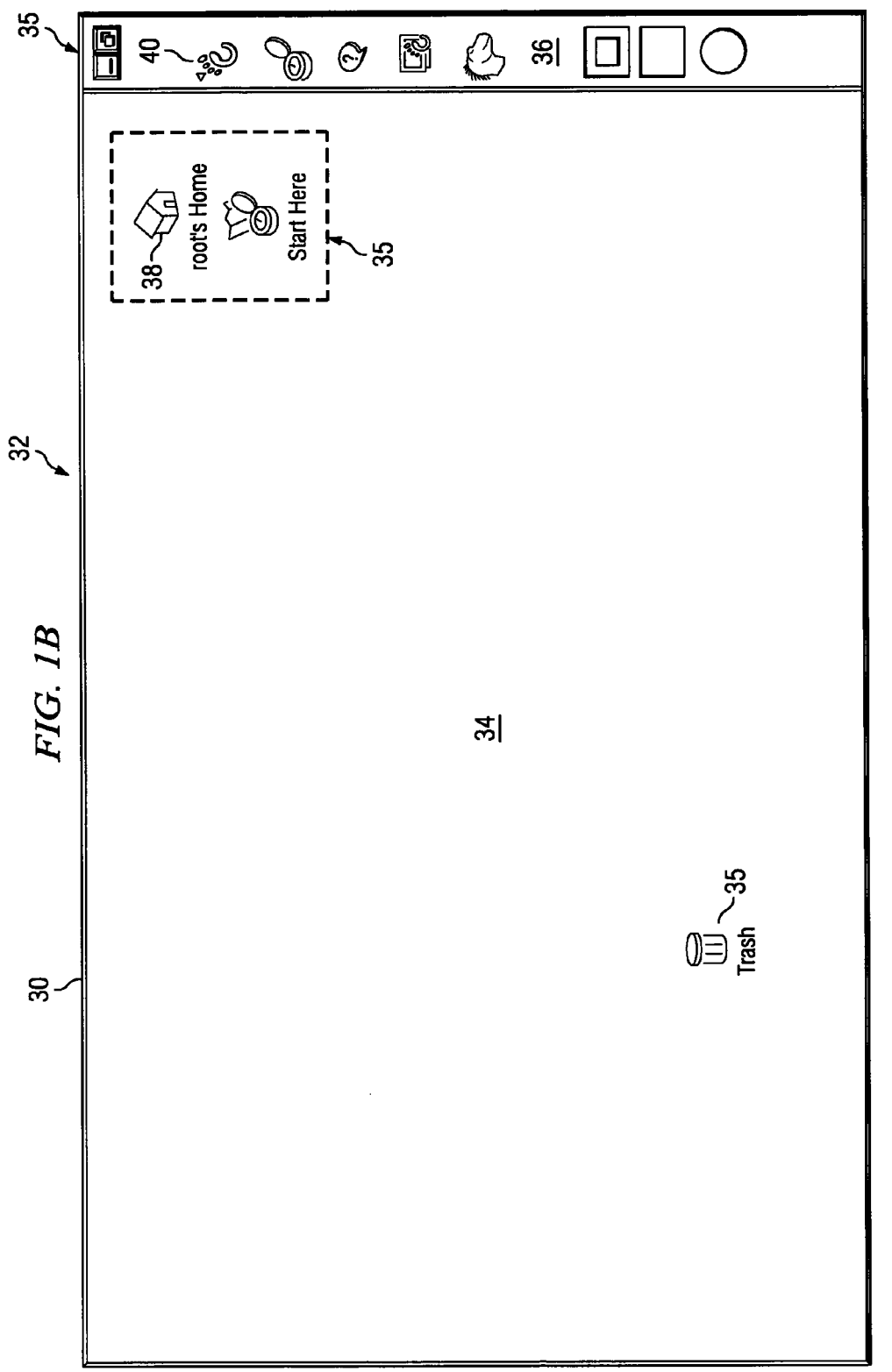

The preferred embodiment of the present invention and its advantages are best understood by referring to FIGS. 1 through 6 of the drawings.

FIGS. 1A-1D are diagrams illustrating screen displays of a client computer display utilizing a computer display control system and method in accordance with an embodiment of the present invention. Briefly, the computer display control system and method of the present invention provides or otherwise enables multiple desktops to be viewed or otherwise displayed on a single computer display device (e.g., desktop of a client or local computer and a remote computer simultaneously displayed on a display device of the client computer) as a single desktop by merging and/or otherwise compositing multiple desktops into a single, viewable desktop. Additionally, embodiments of the present invention enable a user to interact with a composited desktop, thereby enabling the user to interact with multiple computer systems via a single computer display device (e.g., interact with a remote computer via a remote computer desktop simultaneously displayed on a client computer with a client computer desktop).

FIG. 1A is a screen display showing a client computer desktop 10 associated with a client computer 12 and displayed on a client display device 13 associated with client computer 12. Client computer desktop 10 comprises a client background 14 and a variety of different graphics elements indicated generally by 15 (e.g., icons, menu bars or items, and other types of displayable elements). In the embodiment illustrated in FIG. 1A, graphics elements 15 displayed on client display device 13 comprise a client taskbar 16 positioned along the left side of client computer desktop 10, a plurality of client icons 18 also positioned along the left side of client computer desktop 10, and a plurality of active client icons 20, each active client icon 20 associated with and/or otherwise representing an active application on client computer 12 disposed on client taskbar 16. However, it should be understood that graphics elements 15 may comprise any type of graphical image displayed on display device 13 such as, but not limited to, icons, windows, symbols, or other types of graphical illustrations or items.

FIG. 1B is a diagram illustrating a screen display showing a remote computer desktop 30 associated with a remote computer 32 (e.g., remote from a location of client computer 12). In the embodiment illustrated in FIG. 1B, remote computer desktop 30 comprises a remote background 34 and a variety of types graphics elements indicated generally by 35 (e.g., icons, menu bars or items, and other types of displayable elements). In the embodiment illustrated in FIG. 1B, graphics elements 35 comprise a remote taskbar 36 positioned along the right side of remote computer desktop 30, a plurality of remote icons 38 also positioned along the right side of remote computer desktop 30, and a plurality of active remote icons 40, each active remote icon 40 associated with an active application on remote computer 32 disposed on remote taskbar 36. As discussed above in connection with graphics elements 15 of FIG. 1A, graphics elements 35 may comprise any type of graphical image such as, but not limited to, a window, icon, or symbol.

Figure 1C:
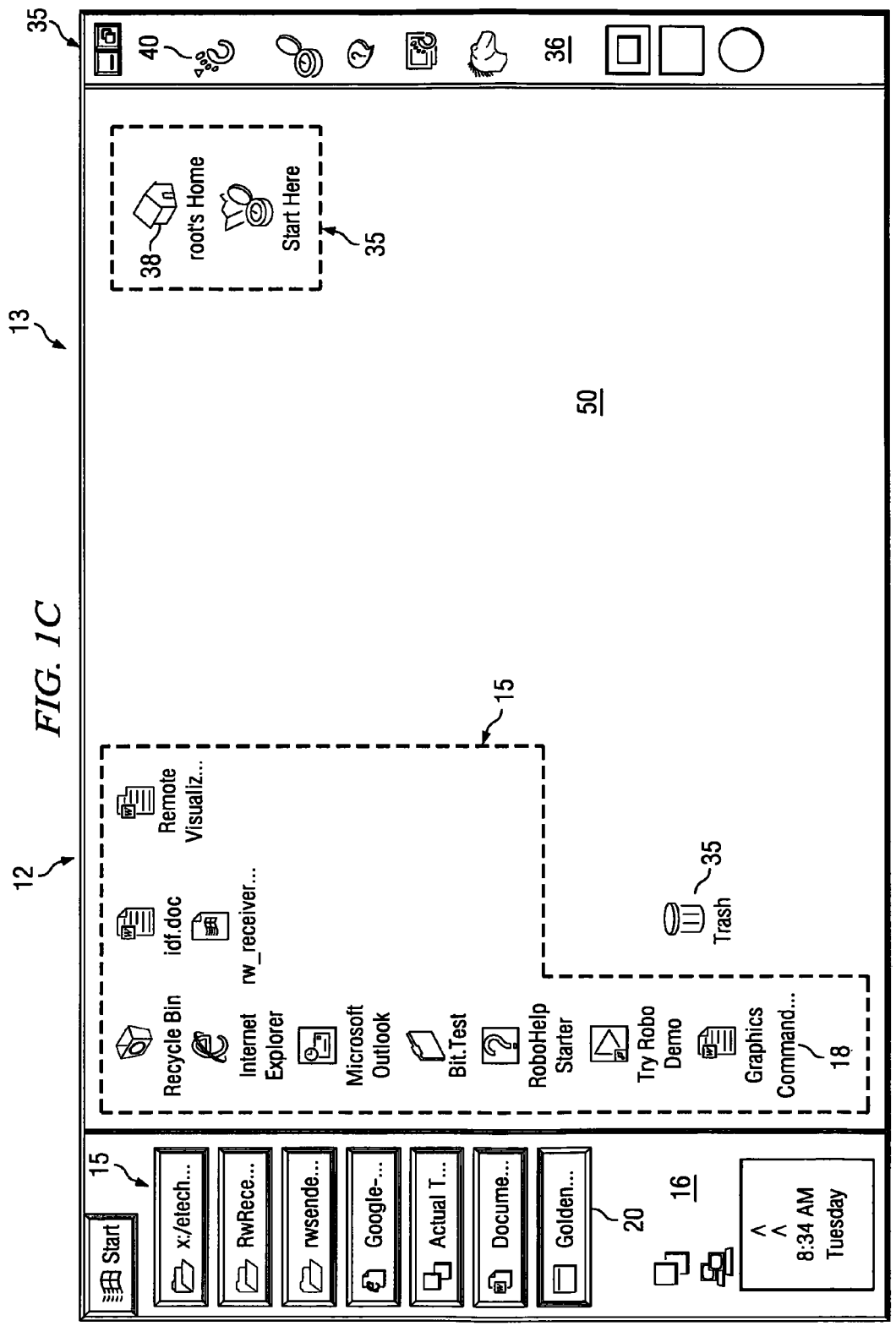

FIG. 1C is a diagram illustrating a composited and/or merged desktop display 50 of client computer 12 and remote computer 32 displayed on client display device 13 utilizing a computer display control system and method in accordance with an embodiment of the present invention. All and/or portions of client computer desktop 10 and/or remote computer desktop 30 are merged, composited and/or otherwise simultaneously displayed as a single, composited desktop display 50 on client display device 13. In composited desktop display 50, graphics elements 15 (e.g., client taskbar 16, client icons 18 and active client icons 20) and graphics elements 35 (e.g., remote taskbar 36, remote icons 38 and active remote icons 40) are visible as if contained on a single desktop, thereby providing both desktops 10 and 30 as simultaneously active desktops. As discussed in detail hereinafter, the compositing of client computer desktop 10 and remote computer desktop 30 is performed in a manner that causes select portions or objects of client computer desktop 10 and/or remote computer desktop 30 to be transparent or otherwise secondarily displayed to facilitate simultaneous display of both client computer desktop 10 and remote computer desktop 30 as a single desktop. Thus, in accordance with embodiments of the present invention, for example, and not by way of limitation, one or more applications of remote computer 32 may be active on remote computer 32 and are actively displayed on composited desktop display 50 on client computer 12 while one or more applications of client computer 12 may be active on client computer 12 and actively displayed on composited desktop display 50 on client computer 12 simultaneously. Therefore, embodiments of the present invention enable a user to access, interact with and view desktops of multiple computers as a single desktop, thereby enabling a user to interact with, for example, the desktop and active applications of remote computer 32 without affecting the active nature of the desktop and applications of the client computer 12.

Figure 1D:
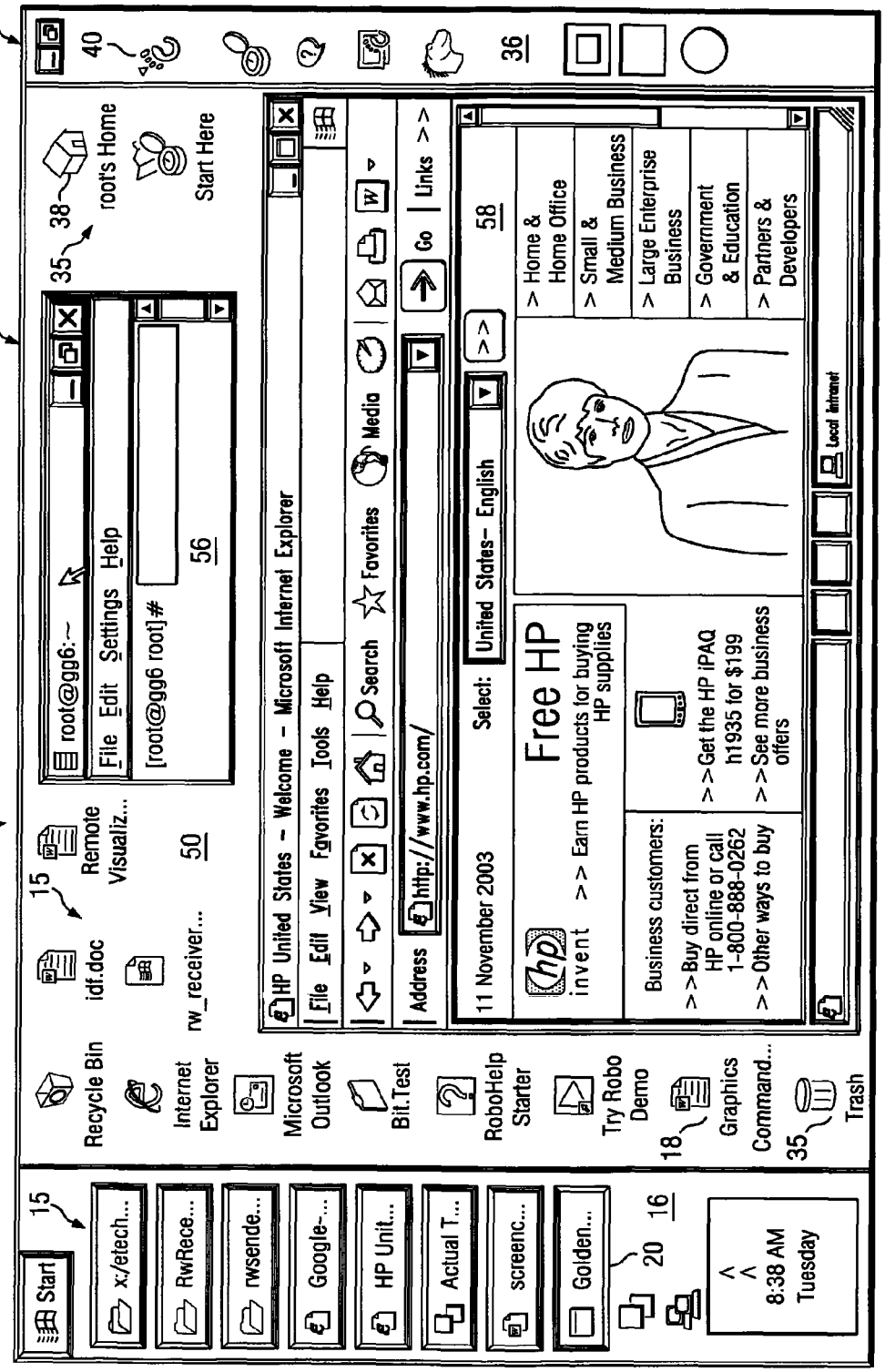

FIG. 1D is a diagram illustrating another embodiment of composited desktop display 50 of client computer 12 and remote computer 32 displayed on client display device 13 utilizing a computer display control system and method in accordance with the present invention. In the embodiment illustrated in FIG. 1D, composited desktop display 50 comprises a console window 56 running on remote computer 32 and a web browser 58 running on client computer 12. Thus, as described above, embodiments of the present invention enable a user to interact with applications running on both client computer 12 and remote computer 32 via the computer on which the composited desktop display 50 is displayed (e.g., interact with applications running on both client computer 12 and remote computer 32 via a composited desktop display 50 displayed on client computer 12), thereby providing both desktops 10 and 30 as active desktops in the composited desktop display 50. In FIGS. 1A-1D, two computer desktops are illustrated and described as being merged and/or otherwise composited. However, it should be understood that embodiments of the present invention may be used to composite and/or otherwise merge and simultaneously display a greater quantity of computer desktops as a single desktop (e.g., multiple desktops of a client computer and/or a desktop of a client computer and desktops of multiple remote computers).

Figure 2:
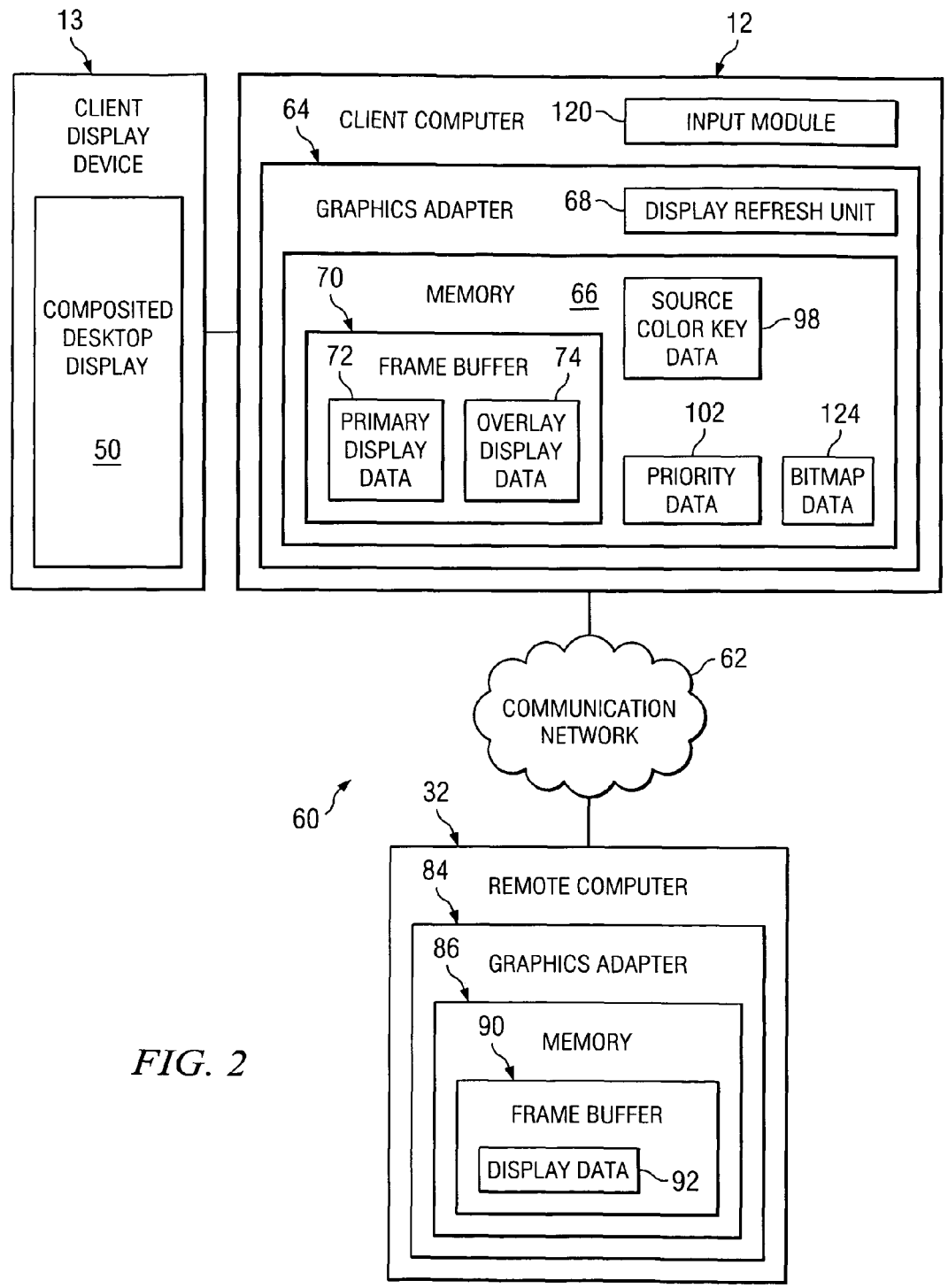
FIG. 2 is a diagram illustrating an embodiment of a computer display control system in accordance with the present invention.

FIG. 2 is a diagram illustrating an embodiment of a computer display system 60 in accordance with the present invention. In the embodiment illustrated in FIG. 2, system 60 comprises client computer 12 and remote computer 32 communicatively coupled with each other via a communication network 62. Display device 13 is associated with client computer 12. Communication network 62 may comprise an intranet, an extranet, a local area network, a wide area network, a personal area network, a metropolitan area network and/or the Internet.

In the embodiment illustrated in FIG. 2, client computer 12 comprises a graphics adapter 64. Graphics adapter 64 may comprise software, hardware, or a combination of hardware and software. In FIG. 2, graphics adapter 64 is illustrated as being a component of client computer 12. However, it should be understood that, if desired, in an alternative embodiment, graphics adapter 64 is not part of client computer 12. In such an embodiment, graphics adapter 64 may be coupled to client computer 12 via a communication network. In the embodiment illustrated in FIG. 2, graphics adapter 64 comprises a memory coupled to a display refresh unit 68.

In some embodiments of the present invention, graphics adapter 64 comprises a graphics chipset which renders an image for client computer 12, for example client computer desktop 10 as shown in FIG. 1A. The image for client computer 12 may be rendered based at least in part based on graphics commands from a system memory of client computer 12 or, for an image corresponding to remote computer 32, graphics commands received from remote computer 32. Rendering of an image typically comprises translating high-level instructions to bitmap images which comprise a matrix of pixels.

In the embodiment illustrated in FIG. 2, memory 66 comprises a frame buffer 70. Frame buffer 70 stores information about image(s) associated with client computer 12 and/or remote computer 32. For example, frame buffer 70 may store information, such as color, transparency values, depth and/or the like, for each pixel in an image. In the embodiment illustrated in FIG. 2, frame buffer 70 comprises primary display data 72 and overlay display data 74. Primary display data 72 comprises information associated with a primary image for display on client computer 12, and overlay display data 74 comprises information associated with overlay images for display on client computer 12. Primary display data 72 and/or overlay display data 74 may each comprise information associated with image information corresponding to client computer desktop 10 or remote computer desktop 30. For example, if client computer desktop 10 is selected or otherwise designated as a primary desktop to be displayed on client computer 12, primary display data 72 comprises information associated with the display of client computer desktop 10 while overlay display data 74 comprises information associated with one or more remote computer desktops 30. Similarly, if remote computer desktop 30 is selected or otherwise designated as a primary desktop to be displayed on client computer 12, primary display data 72 comprises information associated with the display of remote computer desktop 30 while overlay display data 74 comprises information associated with client computer desktop 10 and/or one or more other remote computer desktops 30. Depending on the refresh rate of display device 13, display refresh unit 68 reads the contents of frame buffer 70, merges, composites and/or otherwise processes primary display data 72 and overlay display data 74, and sends the composited data to client display device 13.

In the embodiment illustrated in FIG. 2, remote computer 32 also comprises a graphics adapter 84 which may comprise hardware, software, or a combination of hardware and software. Similarly to client computer 12 as described above, graphics adapter 84 may be configured as a component of remote computer 32, as illustrated in FIG. 2, or be remotely coupled to remote computer 32 via a communication network. In the embodiment illustrated in FIG. 2, graphics adapter 84 comprises a memory 86. In some embodiments of the present invention, graphics adapter 84 comprises a graphics chipset which renders an image for remote computer 32, for example remote computer desktop 30 as shown in FIG. 1B. The image may be rendered based at least in part on graphics commands from a system memory of remote computer 32 or graphics commands received from another computer.

In the embodiment illustrated in FIG. 2, memory 86 comprises a frame buffer 90. Frame buffer 90 stores information associated with image(s) corresponding to remote computer 32. For example, frame buffer 90 may store information such as color, transparency values, depth and/or the like, for each pixel in an image associated with remote computer 32. In the illustrated embodiment, frame buffer 90 comprises display data 92 having information associated with an image(s) corresponding to remote computer 32, for example, remote computer desktop 30 as shown in FIG. 1B.

In operation, a source color key is selected to determine which pixels of client computer desktop 10 and/or remote computer desktop 30 should be transparent (e.g., transparent and/or semi-transparent) and which pixels of client computer desktop 10 and/or remote computer desktop 30 should be non-transparent. For example, in some embodiments of the present invention, the pixel value of remote background 34 of remote computer desktop 32 is selected to be the source color key to facilitate transparency of remote background 34 when displayed on display device 13 with client background 14. Information corresponding to the source color key is stored in memory 66 as source color key data 98. In some embodiments of the present invention, graphics adapter 64 is configured to communicate with remote computer 32 to identify the pixel value associated with remote background 34 and automatically select the pixel value associated with remote background 34 as the source color key. In other embodiments of the present invention, graphics adapter 64 is adapted to interface with graphics adapter 84 of remote computer 32 to automatically change a pixel value associated with remote background 34 to a pixel value associated with the source color key. The source color key may be selected by the user, randomly selected by graphics adapter 64, or selected by graphics adapter 64 based on pixel values currently assigned to images on remote computer 32. For example, graphics adapter 64 may be configured to interface with graphics adapter 84 of remote computer 32 to determine or otherwise identify pixel values currently used or assigned to images on remote computer 32 such that a pixel value not currently used or assigned to images on remote computer 32 may be selected for the source color key. Additionally, in some embodiments of the present invention, graphics adapter 64 may be configured to interface with graphics adapter 84 of remote computer 32 to automatically change or set a pixel value currently used or assigned to remote background 34 to the pixel value designated by source color key data 98.

In operation, graphics image data relating to remote computer desktop 30 (e.g., as defined by display data 92) is received by client computer 12 from remote computer 32 via communication network 62. The graphics image data corresponding to remote computer desktop 30 may be received periodically or in response to a request by client computer 12. Graphics adapter 64 cooperates with display refresh unit 68 to form or otherwise generate composited desktop display 50 on display device 13. For example, in operation, composited desktop display 50 is created by merging or otherwise compositing graphics image data of remote computer desktop 30 with graphics image data of client computer desktop 10 using the selected source color key as a transparency value. Graphics adapter 64 cooperates with display refresh unit 68 to compare pixel values associated with either remote computer desktop 30 or client computer desktop 10 with the source color key as defined by source color key data 98. For example, if client computer desktop 10 is defined or otherwise selected as a primary image for composited desktop display 50, pixel values of remote computer desktop 30 corresponding to the source color key are not displayed (e.g., transparent) in composited desktop display 50 while pixel values not corresponding to the source color key are displayed in the composited desktop display 50. Correspondingly, if remote computer desktop 30 is defined or otherwise selected as a primary image for composited desktop display 50, pixel values of client computer desktop 10 corresponding to the source color key are not displayed (e.g., transparent) in composited desktop display 50 while pixel values not corresponding to the source color key are displayed in the composited desktop display 50. Information associated with identifying or otherwise designating particular desktop as a primary desktop image for composited desktop display 50 is stored in memory 66 as priority data 102. Priority data 102 may be selected or otherwise designated by a user, or system 60 may be configured to automatically designate a particular desktop as the priority or primary desktop (e.g., designating client computer desktop 10 as a default priority desktop). It should also be understood that the priority or primary desktop may be determined or otherwise designated based on source color key assignment or use. For example, if the pixel value of remote background 34 is changed to the pixel value of the source color key, client computer desktop 10 will have priority, or vice versa.

Priority data 102 is also used to determine which graphics elements 15 and/or 35 are displayed on composited desktop display 50. For example, when merging and/or otherwise compositing client computer desktop 10 and remote computer desktop 30 to form composited desktop display 50, one or more graphics elements 15 from client computer desktop 10 may be located coincident with one or more graphics elements 35 from remote computer desktop 30. Graphics adapter 64 cooperates with display refresh unit 68 to determine which graphics elements 15 or 35 to display on composited desktop display 50 based on priority data 102. For example, if client computer desktop 10 is defined as the priority or primary desktop, graphics elements 15 associated with client computer desktop 10 are displayed while graphics elements 35 otherwise located coincident with graphics elements 15 are not displayed or are displayed secondarily to graphics elements 15. Secondarily displaying graphics elements may be performed or accomplished using a variety of methods such as, but not limited to, displaying such secondary graphics elements beneath the primary graphics elements (e.g., such as stacking or tiling multiple elements) and/or displaying such secondary graphics elements having a level of opaqueness less than a level of opaqueness of the primary graphics element (e.g., displaying the secondary graphics elements semi-transparently or "greyed out" relative to a generally opaque primary graphics element). It should be understood that the priority for displaying graphics element may also be determined or otherwise based on the source color key assignment or use. For example, if the pixel value of remote background 34 is changed to the pixel value of the source color key, graphics elements 15 of client computer desktop 10 will have display priority, or vice versa. Further, in some embodiments of the present invention, graphics adapter 64 cooperates with display refresh unit 68 to determine which graphics elements 15 or 35 to automatically move or relocate on composited desktop display 50 based on priority data 102. For example, if client computer desktop 10 is defined as the priority or primary desktop, graphics elements 15 associated with client computer desktop 10 are displayed while graphics elements 35 otherwise located coincident with graphics elements 15 are automatically moved or relocated on composited desktop display 50.

Thus, in some embodiments of the present invention, composited desktop display 50 is formed by displaying the various desktop images in plurality of stacked windows. For example, in some embodiments of the present invention, if client computer desktop 10 is selected or otherwise designated as the primary desktop image, particular image information corresponding to remote computer 32 is displayed in a transparent window (e.g., a window with a transparent background). Thus, for example, as described above, the source color key is selected, designated or otherwise used to display remote background 34 in a transparent state (or at least semi-transparent) such that objects below the window corresponding to remote computer desktop 30 are visible (e.g., objects in a window corresponding to client computer desktop 10). Portions of remote computer desktop 30 that are not background, for example graphics elements 35, are displayed as opaque or non-transparent and hence are visible. Thus, because of the transparency of remote background 34 of the remote computer desktop 30, a user of client computer 12 can view multiple desktops simultaneously in full-screen mode (e.g., as a single desktop display), thereby enabling the user to view portions of client computer desktop 10 that are behind the transparent window.

Embodiments of the present invention also enable user interaction with each computer system (e.g., client computer 12 and/or remote computer(s) 32 via client computer 12) via composited desktop display 50. For example, in the embodiment illustrated in FIG. 2, client computer 12 comprises an input module 120 which may comprise hardware, software, or a combination of hardware and software. Input module 120 determines whether an input (e.g., input received via a mouse or trackpad click or other type of user input) should be directed to client computer 12 or remote computer(s) 32. For example, in operation in accordance with some embodiments of the present invention, input module 120 determines the coordinates (e.g., (x,y) coordinate value) of a user input on client display device 13. From the input coordinates, input module 120 determines or otherwise identifies a pixel value associated with the input coordinate for the displayed desktop windows (e.g., simultaneously, sequentially, randomly, or according to a predetermined order). Thus, for example, if remote computer desktop 30 is the first window layer on display device 13 and having a transparent background 34, input module 120 determines or otherwise identifies the pixel value associated with the input coordinate for the corresponding to remote background 34. If the pixel value for the input coordinate corresponds to a value other than the source color key, thereby indicating that the pixel value is not a transparent value and corresponds to a graphics element within the window, input module 120 interfaces with remote computer 32 to transfer or otherwise communicate the input to remote computer 32 for processing. However, if the pixel value for the input coordinate corresponds to the source color key, thereby indicating that the pixel value is a transparent value, input module 120 does not direct the input to such remote computer 32 and analyzes the next or another window of composited desktop display 50. Thus, input module 120 uses the pixel value corresponding the input coordinate to identify the window, and correspondingly the computer system, to which the input corresponds, thereby providing both desktops 10 and 30 as active desktops in composited desktop display 50.

In other embodiments of the present invention, input module 120 uses bitmap data 124 stored in memory 66 to identify the computer system to which the input corresponds. For example, in some embodiments of the present invention, bitmap data 124 comprises bitmap information corresponding to each desktop displayed by composited desktop display 50 (e.g., each bitmap comprising a sequence of 0s and 1s where 1s correspond to a graphics element of the window and 0s do not correspond to graphics elements, or vice versa). Thus, in response to receiving a user input, input module 120 analyzes the coordinates of the input to bitmap data 124 corresponding to each displayed desktop of composited desktop display 50 to determine which computer system (e.g., client computer 12 or remote computer(s) 32) such input is intended. Input module 120 accordingly interfaces with such computer system to forward or otherwise communicate such input request for processing by the intended computer system. However, it should be understood that system 60 may be otherwise configured to determine and process user inputs corresponding to client computer 12 and remote computer(s) 34 using composited desktop display 50.

Figure 3:
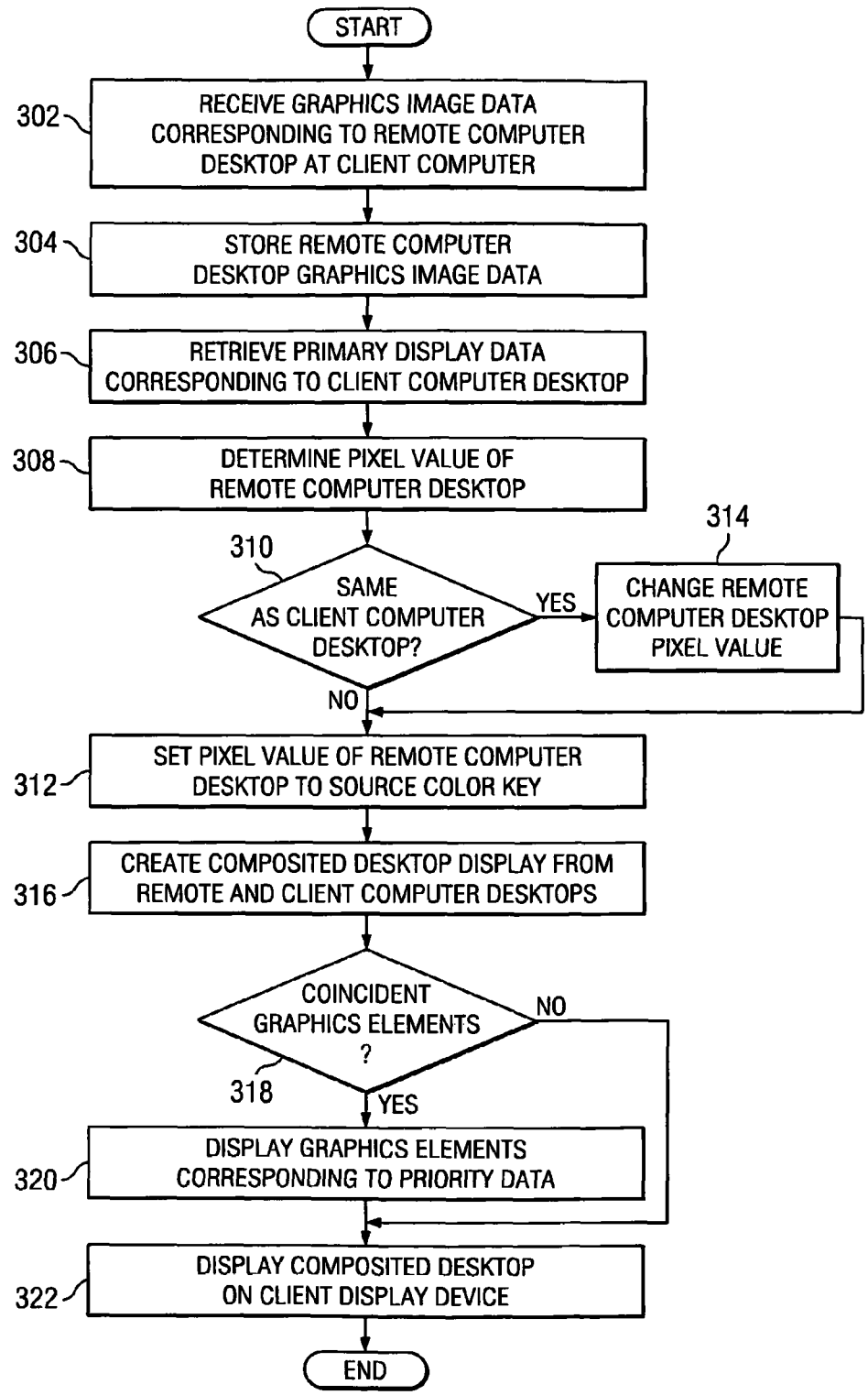
FIG. 3 is a flow diagram illustrating an embodiment of a computer display control method in accordance with the present invention.

FIG. 3 is a flow diagram illustrating an embodiment of a display control method in accordance with the present invention. The method begins at block 302, where client computer 12 receives graphics image data corresponding to remote computer desktop 30 (e.g., via communication network 62). Communications between client computer 12 and remote computer 32 may be preexisting or initiated for the purpose of forming combined desktop display 50. At block 304, the graphics image data corresponding to remote computer desktop 34 is stored in memory 66 of client computer 12. In the embodiment illustrated in FIG. 3, the display control method of the present invention is described as having client computer 12 as a priority or primary desktop and desktop of remote computer 32 as a secondary desktop. However, it should be understood that the method illustrated in FIG. 3 may be otherwise varied such that the desktop corresponding to remote computer 32 is the priority or primary desktop.

At block 306, graphics adaptor 64 retrieves primary display data 72 corresponding to client computer desktop 10. At block 308, graphics adaptor 64 determines a pixel value corresponding to remote background 34 of remote computer desktop 30. At decisional block 310, a determination is made whether a pixel value of remote background 34 is the same as the pixel value for client background 14 of client computer desktop 10. If the pixel value of remote background 34 is not the same as the pixel value for client background 14, the method proceeds to block 312, where graphics adaptor 64 sets or otherwise identifies the pixel value of remote background 34 of remote computer desktop 30 as the source color key. At decisional block 310, if a determination is made that the pixel value of remote background 34 is the same as the pixel value corresponding to client background 14, the method proceeds to block 314, where graphics adaptor 64 changes the pixel value for remote background 34. The method proceeds to block 312 where the changed pixel value is set or otherwise designated as the source color key.

At block 316, composited desktop display 50 is created from remote computer desktop 30 and client computer desktop 10. For example, display refresh unit 68 merges and/or otherwise composites client computer desktop 10 and remote computer desktop 30 and transmits the composited desktops 10 and 30 to display device 13. At decisional block 318, a determination is made whether locations of graphics elements 35 of remote computer desktop 30 coincide with locations of graphics elements 15 of client computer desktop 10 on composited desktop display 50. If locations of graphics elements 35 of remote computer desktop 30 coincide with locations of graphics elements 15 of client computer desktop 10 on composited desktop display 50, the method proceeds to block 320, where graphics elements 15 or 35 are displayed on composited desktop display 50 corresponding to priority data 102. The composited desktop display 50 is displayed on display device 13 at block 322. If a determination is made that graphics elements 35 of remote computer desktop 30 do not coincide with locations of graphics elements 15 of client computer desktop 10, the method proceeds to block 322, where composited desktop display 50 is displayed on client display device 13. As described above, in some embodiments of the present invention, priority data 102 is used to automatically move or relocate graphics elements 15 or 35.

Figure 4:
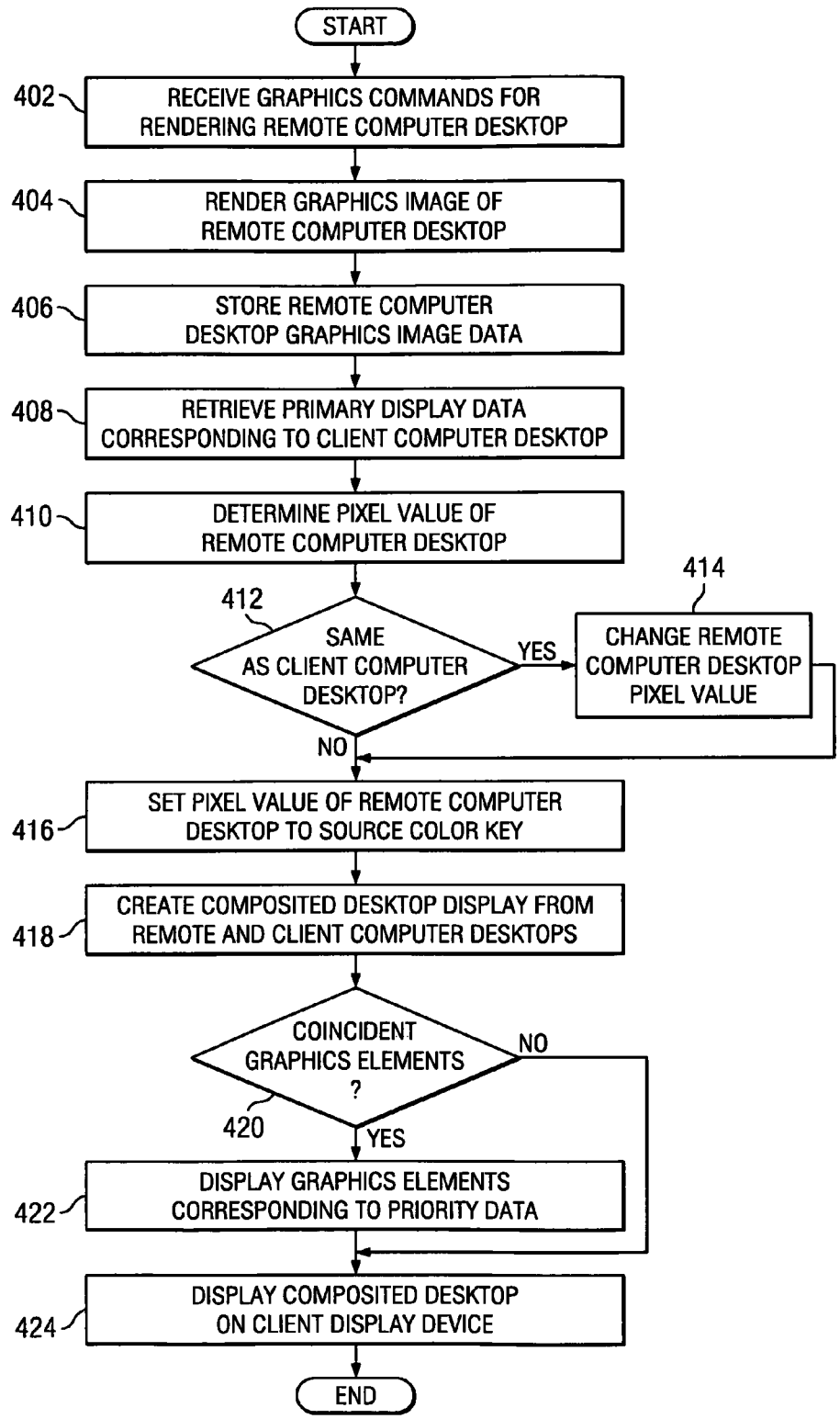
FIG. 4 is a flow diagram illustrating another embodiment of a computer display control method in accordance with the present invention.

FIG. 4 is a flow diagram illustrating another embodiment of a display control method in accordance with the present invention. The method begins at block 402, where graphics adaptor 64 receives graphics commands from remote computer 32 for rendering remote computer desktop 30 (e.g., via communication network 62). For example, in accordance with various embodiments of the present invention, system 60 may be configured to receive or otherwise retrieve graphics image data corresponding to remote computer desktop 30 or receive or otherwise retrieve graphics commands from remote computer 32 for rendering remote computer desktop 30. Communications between client computer 12 and remote computer 32 may be preexisting or initiated for the purpose of forming combined desktop display 50. At block 404, graphics adaptor 64 renders a graphics image of remote computer desktop 30 based on the received graphics commands. At block 406, graphics adaptor 64 stores the image information corresponding to remote computer desktop 30 in memory 66.

At block 408, graphics adaptor 64 retrieves primary display data 72 corresponding to client computer desktop 10. At block 410, graphics adaptor 64 determines a pixel value corresponding to remote background 34 of remote computer desktop 30. At decisional block 412, a determination is made whether a pixel value of remote background 34 is the same as the pixel value for client background 14 of client computer desktop 10. If the pixel value of remote background 34 is not the same as the pixel value for client background 14, the method proceeds to block 414, where graphics adaptor 64 sets or otherwise identifies the pixel value of remote background 34 of remote computer desktop 30 as the source color key. At decisional block 412, if determination is made that the pixel value of remote background 34 is the same as the pixel value corresponding to client background 14, the method proceeds to block 416, where graphics adaptor 64 changes the pixel value for remote background 34. The method proceeds to block 414 where the changed pixel value is set or otherwise designated as the source color key.

At block 418, graphics adaptor 64 cooperates with display refresh unit 68 to create composited desktop display 50 from remote computer desktop 30 and client computer desktop 10. At decisional block 420, a determination is made whether locations of graphics elements 35 of remote computer desktop 30 coincide with locations of graphics elements 15 of client computer desktop 10 on composited desktop display 50. If locations of graphics elements 35 of remote computer desktop 30 coincide with locations of graphics elements 15 of client computer desktop 10 on composited desktop display 50, the method proceeds to block 422, where graphics elements 15 or 35 are displayed on composited desktop display 50 corresponding to priority data 102. The composited desktop display 50 is displayed on display device 13 at block 424. If a determination is made that graphics elements 35 of remote computer desktop 30 do not coincide with locations of graphics elements 15 of client computer desktop 10, the method proceeds to block 424, where composited desktop display 50 is displayed on client display device 13. As described above, in some embodiments of the present invention, priority data 102 is used to automatically move or relocate graphics elements 15 or 35.

Figure 5:
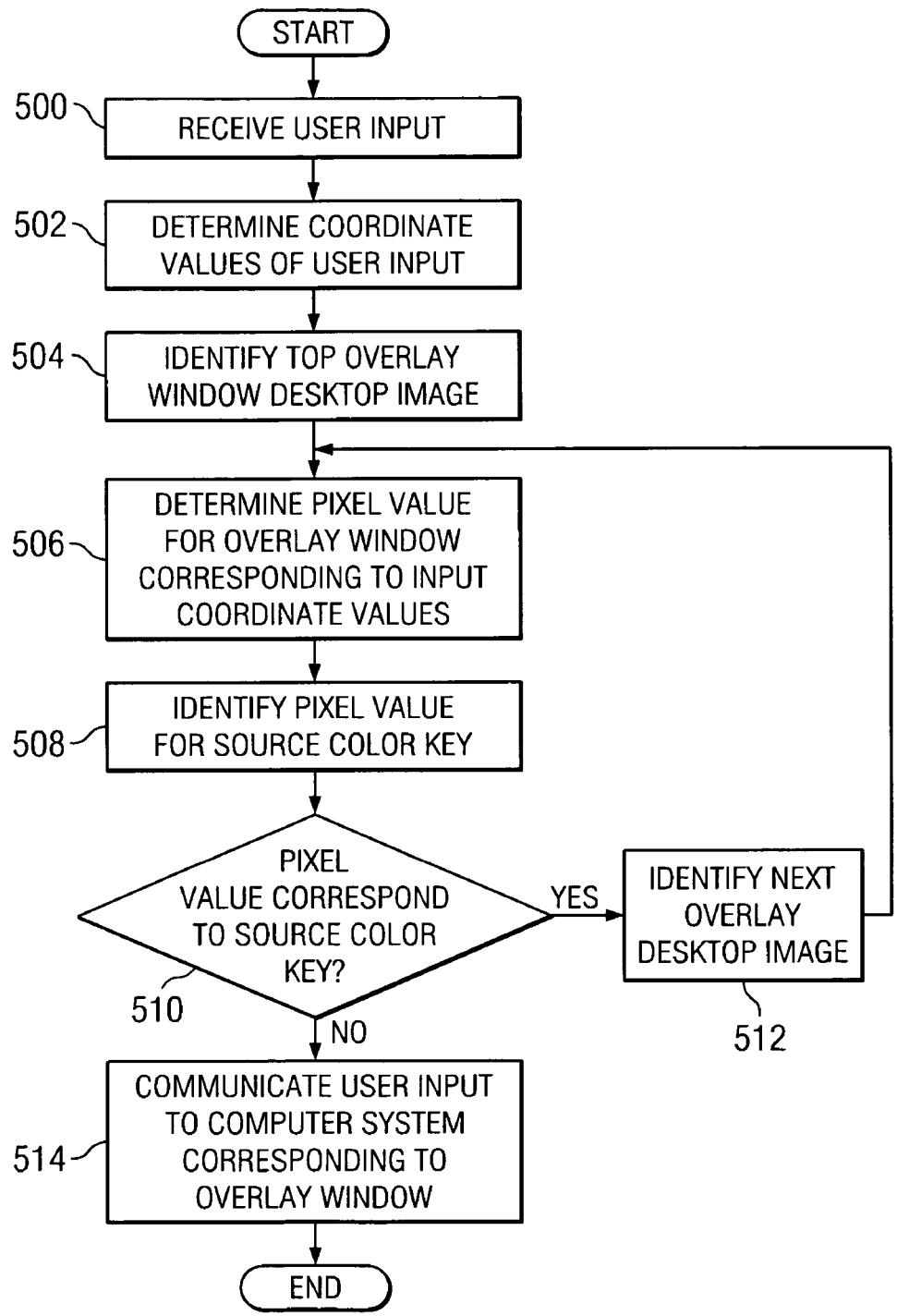
FIG. 5 is a flow diagram illustrating another embodiment of a computer display control method in accordance with the present invention.

FIG. 5 is a flow diagram illustrating an embodiment of a display control method in accordance with the present invention. The method begins at block 500, where user input is received corresponding to composited desktop display 50. For example, as described above, user input may be in the form of a trackpad or mouse click or other type of input. At block 502, input module 120 determines coordinate values corresponding to the user input. At block 504, input module 120 determines a top or uppermost overlay window desktop image corresponding to composited desktop display 50. For example, as described above, some embodiments of the present invention, an overlay window corresponding to remote computer desktop 30 comprises a transparent remote background 34 to enable graphics elements of a window corresponding to client computer desktop 10 disposed below or underneath the remote computer desktop 30 window to be visible via composited desktop display 50.

At block 506, input module 120 determines a pixel value for the overlay window corresponding to the coordinate values of the user input. At block 508, input module 120 identifies a pixel value designated as the source color key. At decisional block 510, a determination is made whether the pixel value corresponding to the user input coordinate values corresponds to the source color key, thereby indicating a transparent pixel value. If the pixel value corresponding to the user input coordinate value corresponds to the source color key, the method proceeds to block 512, where input module 120 identifies the next layer or level of overlay desktop image. The method proceeds to block 506, where input module determines the pixel value for the input coordinate values as described above. If the pixel value for the overlay window corresponding to the input coordinate values does not correspond to the source color key at decisional block 510, the method proceeds to block 514, where input module 120 communicates the user input with the computer system corresponding to the overlay window, for example, client computer 12 or remote computer 32.

Figure 6:
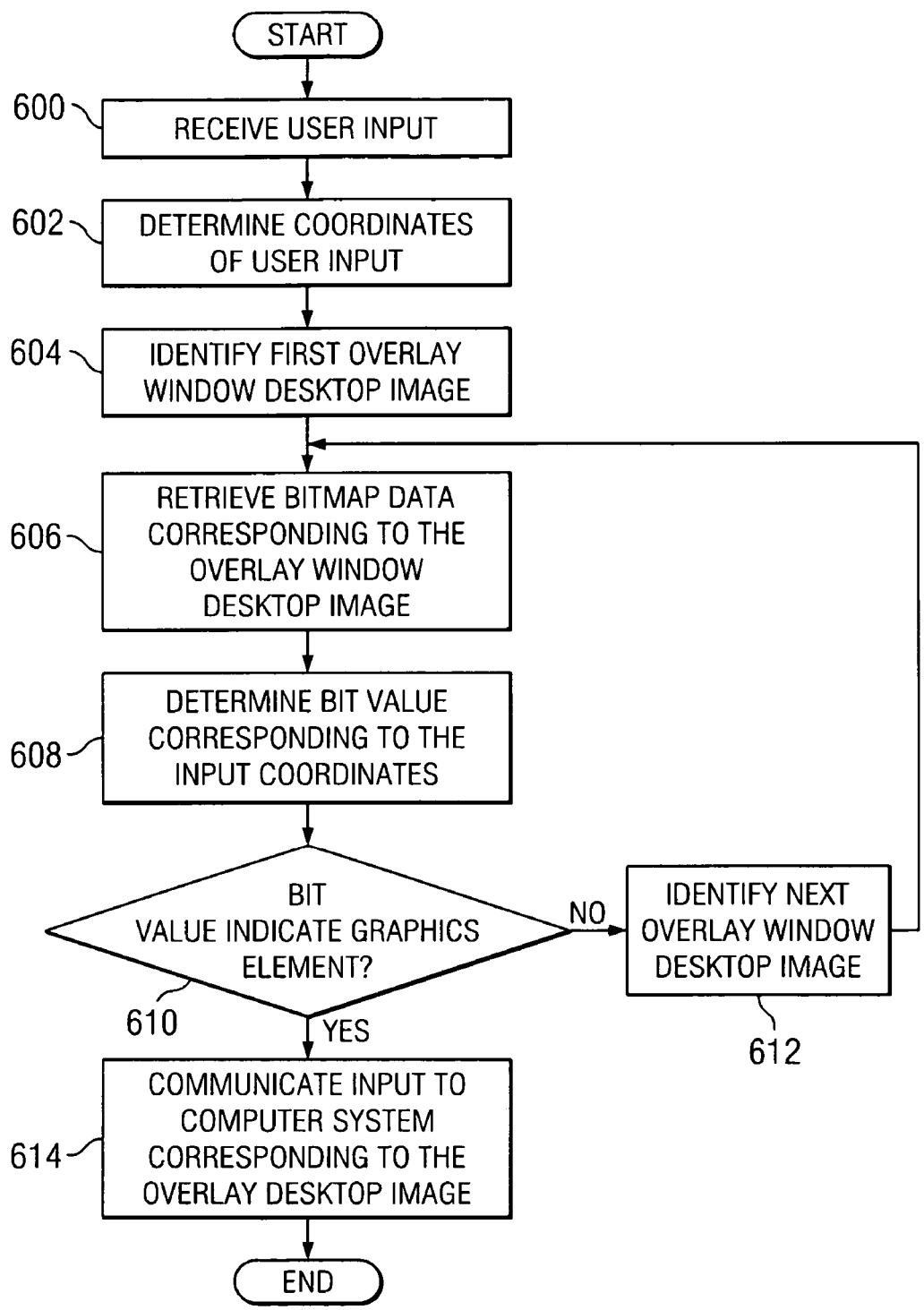
FIG. 6 is a flow diagram illustrating another embodiment of a computer display control method in accordance with the present invention.

FIG. 6 is a flow diagram illustrating another embodiment of a display control method in accordance with the present invention. The method begins at block 600, where a user input is received corresponding to composited desktop display 50. At block 602, input module 120 determines the coordinate values corresponding to the user input. At block 604, input module 120 identifies the top or uppermost overlay window desktop image corresponding to the composited desktop display 50.

At block 606, input module 120 retrieves bitmap data 124 corresponding to the overlay window desktop image. At block 608, input module 120 determines a bit value corresponding to the input coordinates using bitmap data 124 corresponding to the overlay window desktop image. At decisional block 610, determination is made whether the bit value corresponding to the input coordinates indicates or otherwise corresponds to a graphics element 15 or 35 of the overlay window desktop image. If the bit value does not indicate or otherwise correspond to a graphics element 15 or 35 of the overlay window desktop image, the method proceeds to block 612, where input module 120 identifies the next level or layer overlay window desktop image. The method proceeds to 606, where input module 120 retrieves bitmap data 124 for the next identified overlay window desktop image. At decisional block 610, if the bit value corresponding to the input coordinates does indicate or otherwise correspond to a graphics element 15 or 35, the method proceeds to block 614, where input module 120 communicates the user input to the computer system corresponding to the overlay desktop image (e.g., client computer 12 or remote computer 32).

Thus, embodiments of the present invention enable multiple computer desktops to be viewed on a computer display device as a single desktop. For example, the present invention composites multiple desktops and displays the multiple desktops as if it were a single desktop display. Additionally, embodiments of the present invention enable interaction with any of a plurality of different computer systems via a composited desktop display displayed on a single computer system display device. It should be understood that in the methods described in FIGS. 3-6, certain functions may be omitted, combined, or accomplished in a sequence different than depicted in FIGS. 3-6. Also, it should be understood that the methods depicted in FIGS. 3-6 may be altered to encompass any of the other features or aspects described elsewhere in the specification. For example, in the embodiments depicted in FIGS. 3 and 4, system 10 may be configured to automatically set or change a pixel value corresponding to remote background 34 to the source color key as defined by source color key data 98, thereby alleviating a need to determine or compare the pixel value of remote background 34 as indicated in blocks 308 and 310 of FIG. 3 and blocks 410 and 412 of FIG.

4. Further, for example, in the embodiment depicted in FIGS. 3 and 4, system 10 may be configured such that the source color key assignment determines priority for coincident graphics element (e.g., if the pixel value of remote background 34 is set to the source color key, graphics elements 15 of client computer desktop 10 will have display priority over coincident graphics elements 35 of remote computer desktop 30, or vice versa).

What is claimed is:

1. A computer display control system, comprising:
an input module to receive a user input corresponding to a composited desktop display, the composited desktop display displaying at least two active desktops corresponding to at least two different computers, the input module to automatically determine to which of the desktops the user input corresponds based at least on source color key data.

2. The system of claim 1, wherein at least one of the desktops comprises a remote computer desktop.

3. The system of claim 1, wherein the input module is to determine a pixel value corresponding to coordinates of the user input and to access the source color key data corresponding to the pixel value.

4. The system of claim 1, wherein the input module is to determine whether a pixel value corresponding to coordinates of the user input corresponds to a source color key from the source color key data.

5. The system of claim 1, wherein the input module is to identify an overlay layer corresponding to each of the desktops.

6. The system of claim 1, wherein the input module is to determine to which of the desktops the user input corresponds based on a pixel value associated with coordinates of the user input and source color key data associated with the pixel value.

7. The system of claim 1, wherein the input module is to determine to which of the desktops the user input corresponds based on bitmap data corresponding to each of the two desktops and source color key data associated with the bitmap data.

8. The system of claim 1, wherein the input module is to determine whether bitmap data corresponding to coordinates of the user input correspond to a source color key from the source color key data.

9. The system of claim 1, wherein the input module is to use the source color key data to determine whether coordinates of the user input correspond to a transparent pixel value.

10. A computer control display method, comprising:
receiving a user input corresponding to a composited desktop display, the composited desktop display displaying at least two active desktops corresponding to at least two different computers; and
automatically determining to which of the desktops the user input corresponds based at least on source color key data.

11. The method of claim 10, further comprising determining a pixel value of coordinates corresponding to the user input and accessing the source color key data corresponding to the pixel value.

12. The method of claim 10, further comprising determining whether a pixel value of coordinates corresponding to the user input corresponds to a source color key from the source color key data.

13. The method of claim 10, further comprising directing the user input to one of the computers based on the desktop to which the user input corresponds.

14. The method of claim 10, further comprising accessing bitmap data associated with at least one of the desktops and accessing the source color key data corresponding to the bitmap data to determine to which of the desktops the user input corresponds.

15. The method of claim 10, further comprising determining whether bitmap data corresponding to coordinates of the user input corresponds to a source color key from the source color key data.

16. The method of claim 10, further comprising identifying an overlay layer corresponding to each of the desktops.

17. The method of claim 10, further comprising determining whether the user input corresponds to a graphics element associated with one of the desktops.

18. A computer display control system, comprising:
means for receiving a user input via a composited desktop display, the composited desktop display displaying at least two active desktops corresponding to at least two different computers; and
means for automatically determining to which of the desktops the user input corresponds based at least on source color key data.

19. The system of claim 18, further comprising means for determining whether a pixel value corresponding to coordinates of the user input corresponds to a transparent pixel value in the source color key data.

20. The system of claim 18, further comprising means for accessing bitmap data and the source color key data associated with at least one of the desktops corresponding to coordinates of the user input.

21. The system of claim 18, further comprising means for determining whether bitmap data associated with at least one of the desktops corresponds to a source color key from the source color key data.

22. The system of claim 18, wherein the means for automatically determining comprises means for automatically determining whether the user input corresponds to a remote computer desktop.

23. A computer display control system, comprising:
an input module to receive a user input corresponding to a composited desktop display, the composited desktop display overlaying at least two different computer desktops such that the at least two different computer desktops are active in the composited desktop display, the input module to identify to which of the at least two different computer desktops the user input corresponds based at least on source color key data.

24. The system of claim 23, wherein the input module is to determine to which of the desktops the user input corresponds based on a pixel value corresponding to coordinates of the user input and based on the source color key data corresponding to the pixel value.

25. The system of claim 23, wherein the input module is to determine a pixel value corresponding to coordinates of the user input for each of the desktops and to access the source color key data corresponding to the pixel value.

26. The system of claim 23, wherein the input module is to access bitmap data for at least one of the plurality of the desktops corresponding to coordinates of the user input.

27. The system of claim 23, wherein the input module is to determine to which of the desktops the user input corresponds based on bitmap data associated with each of the desktops and the source color key data corresponding to the bitmap data.

28. The system of claim 23, wherein the input module is to determine whether the user input corresponds to a graphics element associated with one of the desktops.

29. The system of claim 23, wherein the input module is to determine whether a pixel value corresponding to coordinates of the user input for at least one of the desktops corresponds to a source color key from the source color key data.

30. The system of claim 23, wherein the input module is to use the source color key data to determine whether a pixel value corresponding to coordinates of the user input of at least one of the desktops corresponds to a transparent pixel value.

* * * * *